United States Patent
Brevoort et al.

(10) Patent No.: US 12,229,318 B2
(45) Date of Patent: Feb. 18, 2025

(54) APPLICATIONS PERMISSIONS FRAMEWORK

(71) Applicant: Salesforce, Inc., San Francisco, CA (US)

(72) Inventors: Michael Brevoort, Littleton, CO (US); Angela Kirchhof, Denver, CO (US); Anders Haig, Camarillo, CA (US); Sai Pinapati, Foster City, CA (US)

(73) Assignee: Salesforce, Inc., San Francisco, CA (US)

( * ) Notice: Subject to any disclaimer, the term of this patent is extended or adjusted under 35 U.S.C. 154(b) by 777 days.

(21) Appl. No.: 17/471,657

(22) Filed: Sep. 10, 2021

(65) Prior Publication Data
US 2023/0087481 A1 Mar. 23, 2023

(51) Int. Cl.
*G06F 21/62* (2013.01)
*G06F 21/00* (2013.01)
*G06F 21/60* (2013.01)
*H04L 9/40* (2022.01)

(52) U.S. Cl.
CPC .......... *G06F 21/629* (2013.01); *G06F 21/604* (2013.01); *H04L 63/101* (2013.01); *H04L 63/102* (2013.01); *G06F 2221/2141* (2013.01)

(58) Field of Classification Search
CPC .......... G06F 2221/2141; G06F 21/604; G06F 21/62; G06F 21/6209; G06F 21/6281; G06F 21/629; G06F 21/50; G06F 21/54
See application file for complete search history.

(56) References Cited

U.S. PATENT DOCUMENTS

2014/0331317 A1* 11/2014 Singh .................. H04L 63/1425
726/22
2018/0007053 A1* 1/2018 Grant .................... H04L 63/102
(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Edward Zee
(74) *Attorney, Agent, or Firm* — Lee & Hayes, P.C.

(57) ABSTRACT

A system, method, and computer-readable media for establishing a framework for managing application permissions in a group-based communication system. Upon receipt, from an application in a group-based communication system, of an attempt to access a target internet domain, an application manifest associated with the application is accessed. The manifest includes a list of approved internet domains previously approved by an administrator of the group-based communication system which the application may access. Following access of the manifest, it is determined whether the target internet domain is included in the list of approved internet domains. If the target internet domain is included in the list of approved internet domains, the application is allowed to access the target internet domain. If the target internet domain is not included in the list of one or more approved internet domains, access to the domain by the application is denied.

20 Claims, 6 Drawing Sheets

(56) References Cited

U.S. PATENT DOCUMENTS

2018/0287982 A1   10/2018  Draeger et al.
2020/0218798 A1*  7/2020  Kosaka .................. G06F 9/451

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

APPLICATIONS PERMISSIONS FRAMEWORK

TECHNICAL FIELD

Embodiments of the invention relate to establishing a secure framework for managing online permissions. More specifically, embodiments of the invention relate to establishing a framework of permissions for a group-based communication system, authorizing applications to access only approved resources.

In many online platforms and systems, third-party applications are oftentimes incorporated, providing additional tools or resources not originally present. This is especially true in group-based communication systems, which may utilize online applications that access Internet resources and devices such as the camera, microphone, messages, and other features of the group-based communication system. For many users, there is an inherent sensitivity that if applications have unfettered access to the group-based communication system and associated client device, there may be a risk of privacy intrusions or loss of data. For an average user, it can be challenging to know which applications and domains are trustworthy and which may pose a security or privacy risk.

Accordingly, what is needed is a system and method of pre-approving access to online domains from a group-based communication system, and which prevents applications from accessing non-approved online domains. Furthermore, with the ever evolving and changing nature of applications, a need further exists for a system and method that is able to review updates and changes made to online domains to determine in an efficient manner, if access to the online domains should continue or if access to the online domains should be eliminated.

SUMMARY

Embodiments of the invention solve the above-mentioned problems by providing a system, method, and computer-readable media for establishing a framework for managing application permissions in a group-based communication system.

A first embodiment of the invention is directed to one or more non-transitory computer-readable media storing computer-executable instructions that, when executed by a processor, perform a method of establishing a framework for managing application permissions in a group-based communication system, the method comprising: receiving, from an application in a group-based communication system and during use of the application, an attempt to access a target internet domain; accessing, based on an application manifest associated with the application, a list of one or more approved internet domains previously approved by an administrator of the group-based communication system for the application to access; determining whether the target internet domain is included in the list of one or more approved internet domains; if the target internet domain is included in the list of one or more approved internet domains, allowing the application to access the target internet domain; and if the target internet domain is not included in the list of one or more approved internet domains, denying access to the target internet domain to the application.

A second embodiment of the invention is directed to a method of establishing a framework for managing application permissions in a group-based communication system, the method comprising: receiving, from an application in a group-based communication system and during use of the application, an attempt to access a target internet domain; accessing, based on an application manifest associated with the application, a list of one or more approved internet domains previously approved by an administrator of the group-based communication system for the application to access; determining whether the target internet domain is included in the list of one or more approved internet domains; if the target internet domain is included in the list of one or more approved internet domains, allowing the application to access the target internet domain; and if the target internet domain is not included in the list of one or more approved internet domains, denying access to the target internet domain to the application.

A third embodiment of the invention is directed to a system of establishing a framework for managing application permissions in a group-based communication system, the system comprising: a data store, a processor, and one or more non-transitory computer-readable media storing computer-executable instructions, that when executed by the processor, perform a method of establishing a framework for managing application permissions in a group-based communication system, the method comprising: receiving, from an application in a group-based communication system and during use of the application, an attempt to access a target internet domain; accessing, based on an application manifest associated with the application, a list of one or more approved internet domains previously approved by an administrator of the group-based communication system for the application to access; determining whether the target internet domain is included in the list of one or more approved internet domains; if the target internet domain is included in the list of one or more approved internet domains, allowing the application to access the target internet domain; and if the target internet domain is not included in the list of one or more approved internet domains, denying access to the target internet domain to the application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
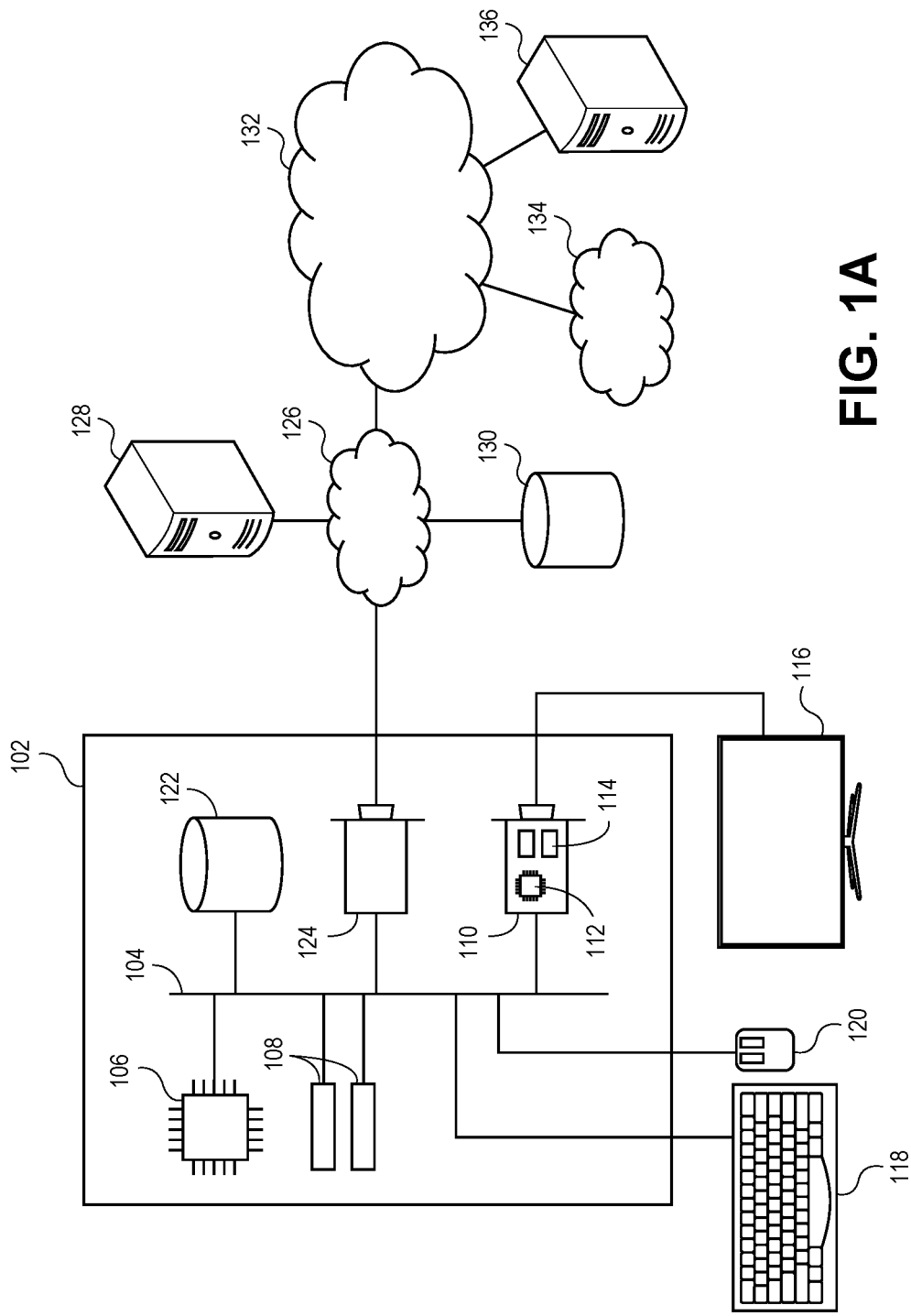
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

At a high level, embodiments of the present invention are directed to providing users of a group-based communication system with a more secure framework of application permissions. Through such a framework, administrators may control what domains and other resources can be accessed by the applications while running the group-based communication system. Administrators may review the permissions and features of domains to determine whether to pre-approve access to the domains to users of the group-based communication system. Enforcement may be made at the runtime of the group-based communication system, blocking calls to non-approved domains.

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, a job title, a skill set, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Operational Environment for Embodiments of the Invention

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex Application Programming Interface (API) (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
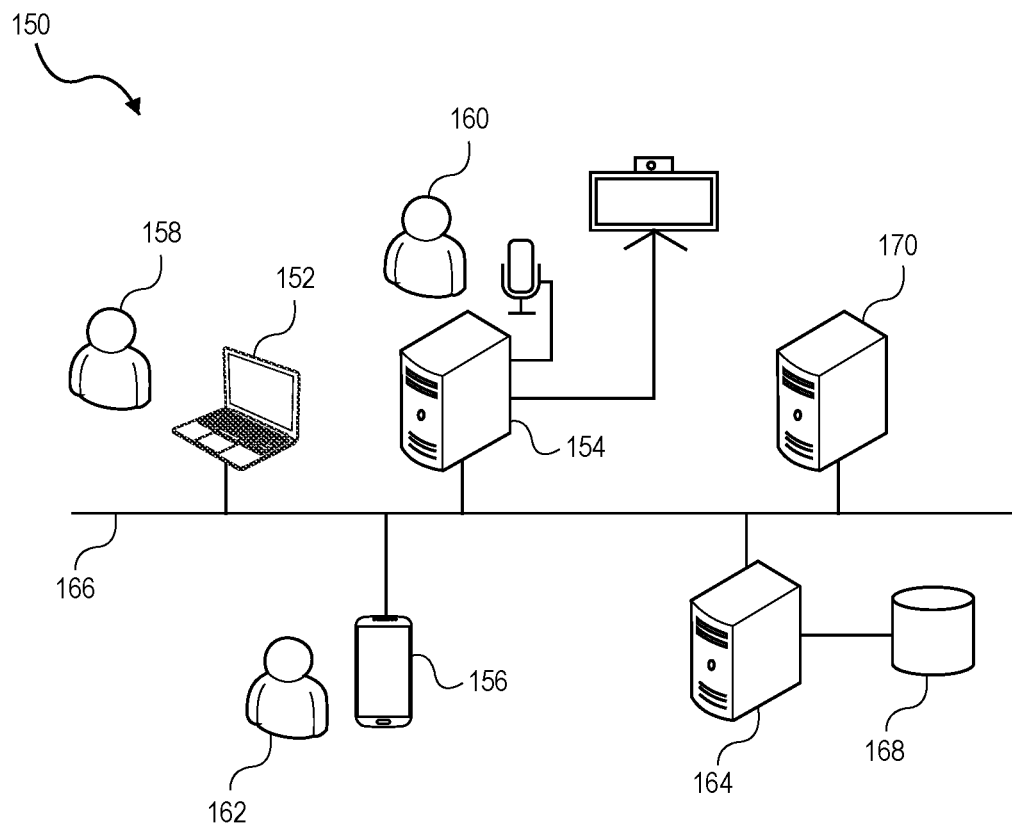
FIG. 1B depicts an exemplary diagram illustrating components of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Group-based communication system server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively, or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a WiFi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

As used herein, the term "application" refers to any online or web-based computer application having an API that may be communicatively coupled to or associated with the group-based communication system. The group-based communication system may be paired with, or associated with, a plurality of applications providing additional functions and features, some of which may not be originally available in the group-based communication system. For example, an application may provide: a video conferencing feature that can be accessed from the group-based communication system; a polling feature that can be inserted into a communication thread; connect the group-based communication system with an online calendar; among many other features. Furthermore, these applications may be associated with one or more online internet domains, with each online internet domain having its own virtual address space and an API. The API of the group-based communication system may call out to and communicatively connect to the API of the called domain. Non-limiting examples of such applications that may be paired with or associated with the group-based communication system includes, but is not limited to Google, Zoom, and IBM applications.

Figure 2:
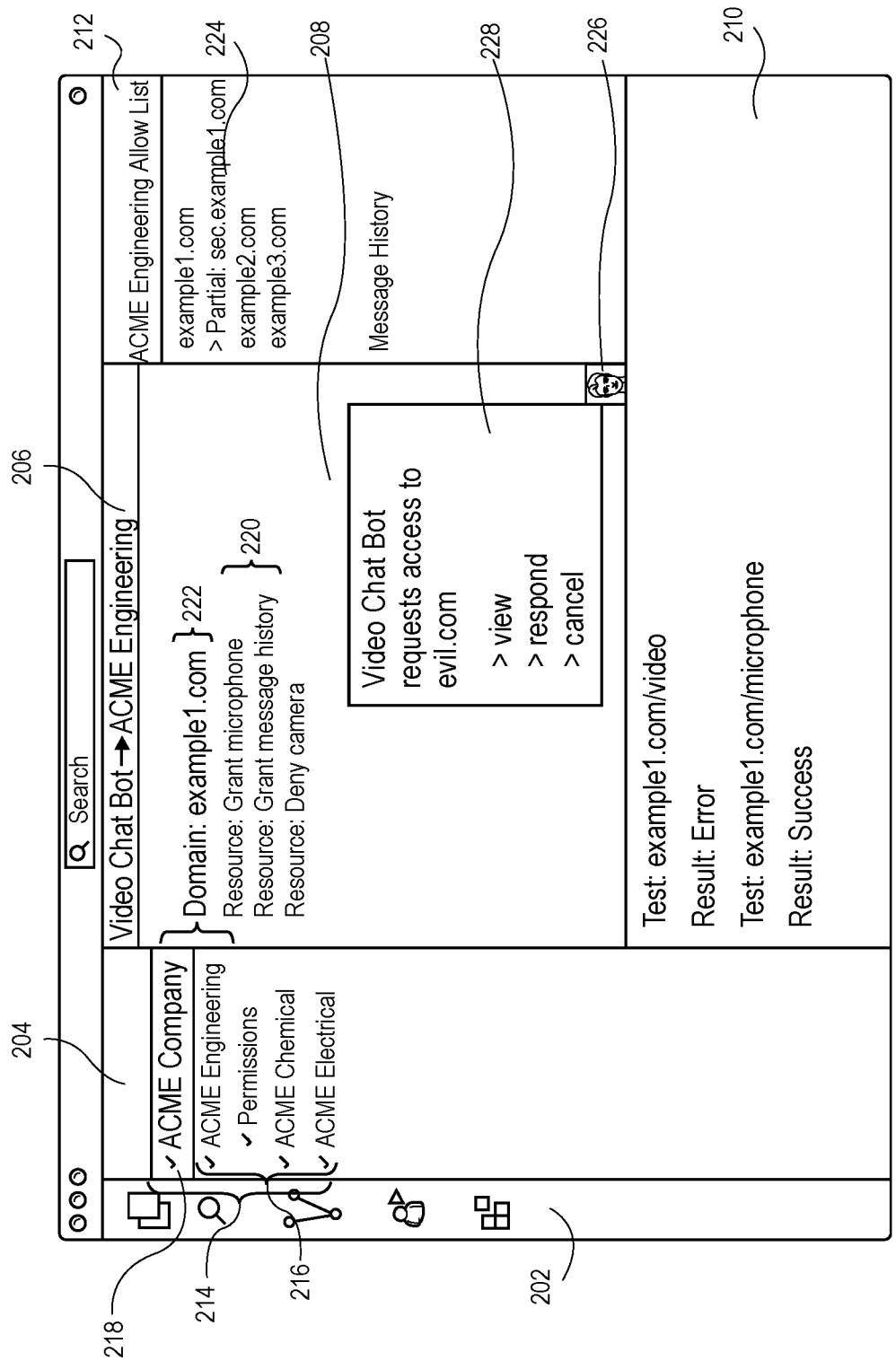
FIG. 2 illustrates a user interface of the install-time of an application in a group-based communication system for certain embodiments.

FIG. 2 depicts an exemplary embodiment of an install-time user interface 200 for an applications permissions framework for a group-based communication system, which will be useful in illustrating the operation of various embodiments, as discussed in further detail below. User interface 200 depicts the install-time of the application permissions framework, which may be accessed by an administrator or other user having pre-approved credentials. An administrator, as used herein, may refer to a user having credentials or pre-approved authority to make system-wide or network-wide changes to the group-based communication system, including accessibility to online internet domains, applications, and other features and functionalities of the group-based communication system.

Broadly, user interface 200 comprises a plurality of objects such as panes, text entry fields, buttons, messages, or other user interface components. As depicted, user interface 200 comprises a toolbar pane 202, organization pane 204, organization header 206, command pane 208, test pane 210, and allow list pane 212. Through user interface 200, an administrator may pre-approve or otherwise permit an application's access to domains that the group-based communication system may call out to and connect with via a connection between the API of the domain with the API of the group-based communication system. In some embodiments, and as described in greater detail, only domains included in an allow list or other approval list may be accessible by applications installed in the group-based communication system.

As described in greater detail below, the group-based communication system can be portioned into different workspaces, which can be associated with different groups of users. For example, a group-based communication system can be portioned as including members of an entire organization or company. Furthermore, the organization may be portioned into workspaces, which in turn may be subdivided into channels. In some embodiments, an administrator may grant access to domains at an organization level, where an application installed for the organization is granted the same access to the domains throughout the organization. In further embodiments, an administrator may grant access to domains on a workspace or channel level, where permissions are granted for an application specific to a particular workspace or channel and may differ from the permissions granted to the application in a different workspace or channel. For example, channels may be created for specific projects or for specific teams, with members having particular needs or topics of varying levels of sensitivity. Accordingly, an administrator may establish permissions for an application at either an organization level, effective on all channels and members within the organization, a workspace level, effective for all channels within that workspace, or at an individual channel level. For example, a channel comprised of an organization's information technology staff may be granted additional permissions and may access additional domains then a channel composed of an organization's sales team. Accordingly, granularity in the selection of permissions provides administrators with flexibility and control for establishing permissions.

As depicted, install-time user interface 200 may comprise a toolbar pane 202, providing the administrator with different tools needed to input commands and instructions or which may aid in using user interface 200. As further depicted, user interface 200 may comprise an organization pane 204, providing the administrator an organization list 214 listing projects, channels, or other organizational structuring of the group-based communication system. The administrator may navigate between different organizations, workspaces, and channels using organization list 214. For example, in some embodiments, through selection via organization list 214, an administrator may select a channel 216 for establishing application permissions for that specific channel 216. For example, the administrator may select the ACME Engineering channel and create a list of accessible domains that an application being installed may access from that channel. Optionally or additionally, the administrator may instead select the organization 218 or workspace (not shown) for establishing permissions at an organization level.

In some embodiments, user interface 200 may comprise a command pane 208, providing the administrator an area for inputting permissions for allowing the application to access domains or other resources within the group-based communication system. Following the selection of a channel 216 for granting permissions, the application name and channel name may be displayed in the header 206, providing a visual representation of which channel (or organization or workspace) the administrator is granting the application permissions for. The administrator may type or otherwise input instructions in command pane 208. For example, after selecting the ACME Engineering channel in the Video Chat Bot install interface, the administrator may view and edit a manifest associated with the application describing the permissions requested by and/or granted to the application in command pane 208. In this way, the administrator can control permissions to access domains 222 and resources 220 for the application within the ACME Engineering channel. Continuing with the illustrated example, the administrator may input a domain 222, such as "example1.com" allowing the Video Chat Bot to call out to "example1.com" from within the ACME Engineering channel of the group-based communication system. As described in greater detail below, an administrator may grant full permission or partial permissions for each domain or resource, and through command pane 208, may further input permissions 220 for each domain or resource. In some embodiments, domains and the associated permissions therefore are specified by a provider of the application, and the administrator can approve or deny individual permissions. It is further contemplated that different administrators for different channels may control the permissions for the same application within the respective channels differently. For example, an administrator for the ACME Electrical channel may deny the video chat bot permission to access message history, while the administrator for the ACME Engineering channel might grant that same permission.

In some embodiments, the default setting of the applications permissions framework for the group-based communication system may be that unless an administrator has pre-approved or pre-authorized access, the application will be denied access to a domain 222 or resource 220. In determining which domains 222 or resources 220 may be approved, an administrator may review the source code of the application and how (and for what purpose) it accesses domain 222 or resource 220 and manually review for features or other factors that would warrant permitting or denying access. However, in further embodiments, the administrator may review an application manifest of the application for a more efficient determination of the features and permissions sought by the application, including all domains such as domain 222, and resources such as resources 220. The application manifest may include information about the application, including the features, permissions sought, functionality, metadata, and other information about the domain or domains to be accessed. In some embodiments, and as described in greater detail herein, a machine learning algorithm may be used for automatically reviewing application manifests to determine whether a domain 222 or resource 220 should be approved for access for a given application. The machine learning algorithm may be operable to review manifests and source code for potentially dangerous features or overbroad permissions that could pose security risks, or which may lead to the loss of data. Following the review of the manifest, one or more domains 222 or resources 220 may be selected for approval for the application, allowing the application to access the selected domains 222 or resources 220. This process may be completed in the manner described above.

In some embodiments, after an administrator grants access to one or more domains 222 for a first application, the one or more domains 222 may be added to an allow list 224. The allow list 224 may be a list, accessible by the group-based communication system, providing an approved list of domains 222 that applications in the group-based communication system may successfully call out and connect to without specific approval. The allow list 224 may be either channel specific, workspace specific, or organization specific, listing the pre-approved domains 222 that applications may successfully access without manual administrator review. In some embodiments, if a domain is not included in the allow list 224 and the administrator has not approved the application to access that domain using domain list 222 using interface 200, then the application will not be able to access the domain from within the group-based communication system. Such strict restrictions may aid in preventing the inadvertent disclosure of data to a suspect or less-then-secure domain. Accordingly, in some embodiments, an administrator is not required to place a restricted domain on a blocklist; rather, the group-based communication system is secure by default by only permitting applications to access pre-approved domains 222. Alternatively, in some embodiments, a blocklist is additionally supported, such that an application may not access a domain included on the blocklist even if an administrator has approved the application's manifest including the blocked domain.

In some embodiments, each channel, workspace, or organization may have its own allow list 224, that may be continually updated with domains 222 that applications may access. Furthermore, the allow list 224 may be updated to remove previously approved domains 222 for a variety of reasons, such as updates to the domains 222 or the discovery of potentially harmful code. Administrators may access the allow list 224 via the user interface 200, through allow list pane 212. In some embodiments, the allow list 224 may further include additional information for each domain 222. For example, through allow list pane 212, an administrator may select a domain 222 included in the allow list 224 and be provided information about the domain 222, including but not limited to the permissions 220 granted to the domain 222 (such as, for example, a subset of URLs associated with domain 222 that can be accessed, or a set of local resources that can be accessed in connection with domain 222, as described below), metadata associated with the domain 222, or other information. Such information may be displayed in the user interface, such as through a new window generated and populated in the user interface 200.

In some embodiments, in addition to an administrator manually adding domains 222 to an allow list 224, domain list 222, or permission list 220, the administrator may programmatically add domains 222 to the allow list 224 using an API provided by the group-based communication system. For example, an administrator may wish to add a large number of company-internal domains 222 to an allow list. Alternatively, an application may request access to multiple resources of the group-based communication system or hardware. Some of these functionalities or requests for access may be harmless, in that the resources relate to non-sensitive features of the group-based communication system. Accordingly, an administrator may write code using the API to provide for pre-approval of resources or domains having a predetermined threshold of low security or sensitivity risk.

In some embodiments, some applications may request access to a plurality of resources and domains, some of which may be harmless or low-risk and some of which may pose greater security or other risks. Accordingly, an administrator may grant an application partial permissions to domains 222 or other requested resources 220 rather than complete permissions. For example, an application may request permission to access the camera, microphone, and message history of a client device connected to the group-based communication system. Rather than approving all permissions sought by the domain 222 and resources 220, an administrator may grant partial permissions. For example, the administrator may approve access to the microphone and message history of the client device, while withholding approval to access to the camera, as shown.

Similarly, partial permissions may be granted with respect to allow list 224. With respect to a domain, partial permissions may control access to specific subdomains or URLs within the domain. Returning to FIG. 2, the administrator, accessing command pane 208 may input only partial permissions for the domain, "example1.com." For example, as shown, the administrator has whitelisted only the "sec.example1.com" subdomain of "example1.com." Continuing with the example, the administrator may grant full permissions to other domains, such as allowing any application access to example2.com and example3.com. In some embodiments, where an administrator has allow-listed partial permissions for a domain, the administrator does not need to expressly block list other permissions associated with that domain. For example, in the depicted example, applications would automatically be prohibited from accessing "insecure.example1.com" based on the allow-listing of a different subdomain "sec.example1.com," without the administrator manually specifying a block. Rather, the lack of an express permission prohibits such access. In some embodiments, resources may similarly be allow-listed. For example, an administrator may allow-list "message history" such that any application installed may access the message history of the associated channel.

In some embodiments, user interface 200 may further comprise a test pane 210, for quality assurance purposes. For example, after entering instructions or commands in command pane 208, an administrator may run a test of the instructions in test pane 210 to determine if the application can successfully call out to a domain 222. If the administrator has accurately entered the permissions for a specific domain, then the administrator will receive a positive message in test pane 210, indicating the application successfully called and connected with domain 222. If the administrator entered the instructions in command pane 208 incorrectly, or to ensure that the application is not connecting to a domain 222 that has not been approved, then the administrator will receive a negative message in test pane 210, indicating the application called to domain 222 and connection did not occur.

It is increasingly rare for applications to remain static for long, as new features are added or bugs in the code are being fixed. Accordingly, over time, the set of permissions requested by an application that has been previously approved by an administrator may receive an update, and a new version of the previously reviewed application may be considered. Accordingly, several approaches may be taken to maintain the security of the group-based communication system.

For example, in some embodiments, updates to a previously approved application may cause all permissions previously granted to the application to be automatically removed until a review of the updated application can take place. In such an embodiment, updating an application operates effectively as uninstalling the previous application and installing a new application. In other embodiments, the received update may be placed in a sandbox for review, such that the previous version continues to operate with the previous permissions until an administrator can review and approve the updated version. In some such embodiments, following the removal of the permissions or the placement of the updated version in a sandbox for review, a notification may be sent to the administrator and displayed in user interface 200.

Upon receiving the notification that an updated application is available, the administrator may review the updated application using any of the methods described above, including for example, reviewing the manifest of the updated application. If the administrator determines that the update to the application does not materially change the functionality of the application, or if the update is harmless, then the administrator may restore the removed permissions or release the update version such that it replaces the prior version. Furthermore, in some embodiments, a machine learning algorithm may be implemented for reviewing updated applications placed under review. The machine learning algorithm may review the manifest or source code detailing the update to the application to determine if the update results in a material change in the functionality of the application. If a determination is made that the update does not alter the relevant functionality of the application or if the update is harmless, then the algorithm may automatically restore the removed permissions or release the updated version from the sandbox. If the determination is made that the update does materially alter the functionality of the application, then the updated application may remain in the sandbox and a notification may be sent to an administrator. Even further, if the determination is made that the update materially alters the functionality of the application, and the new functionality is deemed harmful or at risk, then the administrator may be specifically notified of this determination.

In further embodiments, an update to an application present may be known prior to implementation of the update. For example, a developer of the application may provide an advance review version of the updated application. Accordingly, an administrator, or algorithm, may review the manifest or code of the proposed update to the application, and prospectively remove permissions prior to implementation of the update if there is a determination that the functionality has changed, and the permissions should be removed. Otherwise, the application may retain its permissions as the update is rolled out, without a pause in access to the domain 222 or resource 220.

In further embodiments, following an update to an application, previously approved domain 222 may remain on the permissions list for the application and users may continue to access the domain 222 in the same manner as prior to the update. However, a message or notification may be generated and sent to an administrator to audit the updated application, to determine whether the updated application has altered functionality, or whether the updated application comprises additional features or requests certain permissions that would cause the administrator to update the allowed domains 222 or allowed resources 220 for the application. Additionally, this review may be performed automatically using any of the methods described above with respect to automated review of updated applications. If the administrator determines that the update to the application does not materially change the application, then the permissions for the application may remain unchanged. If, however, the administrator determines that the update causes a material change to the application, and the material change poses a security or other risk, then the updated application may have its permissions updated or revoked.

In some embodiments, and as described in greater detail below, user interface 200 may further comprise an alert 226 to alert the administrator when an application unsuccessfully attempts to access a domain 222 for any permission-related reason. For example, if an application attempts to access a domain 222 that has not been approved, a notification may be automatically sent to the administrator and displayed in the user interface 200, for the administrator's review. Furthermore, a user may also submit a request to the administrator to review the status of a domain 222 following an application's failed attempt to access the domain 222. Upon receiving a request to review, either automatically or upon a user request, the administrator may select the alert 226 and a request window 228 may populate in the user interface 200. Upon population, the administrator may review the request window 228 and make a determination as to whether to approve the application's access to the domain 222. In some embodiments, user requests for approving an application's access to a domain 222 may be approved automatically, rather than through an administrator manually processing the request. For example, in some embodiments, an administrator may include instructions for automatically approving access to domains 222 based on the features of the domain 222 and/or what permissions the application seeks. The process for automatically approving user requests may be performed in accordance with the methods described above.

Figure 3A:
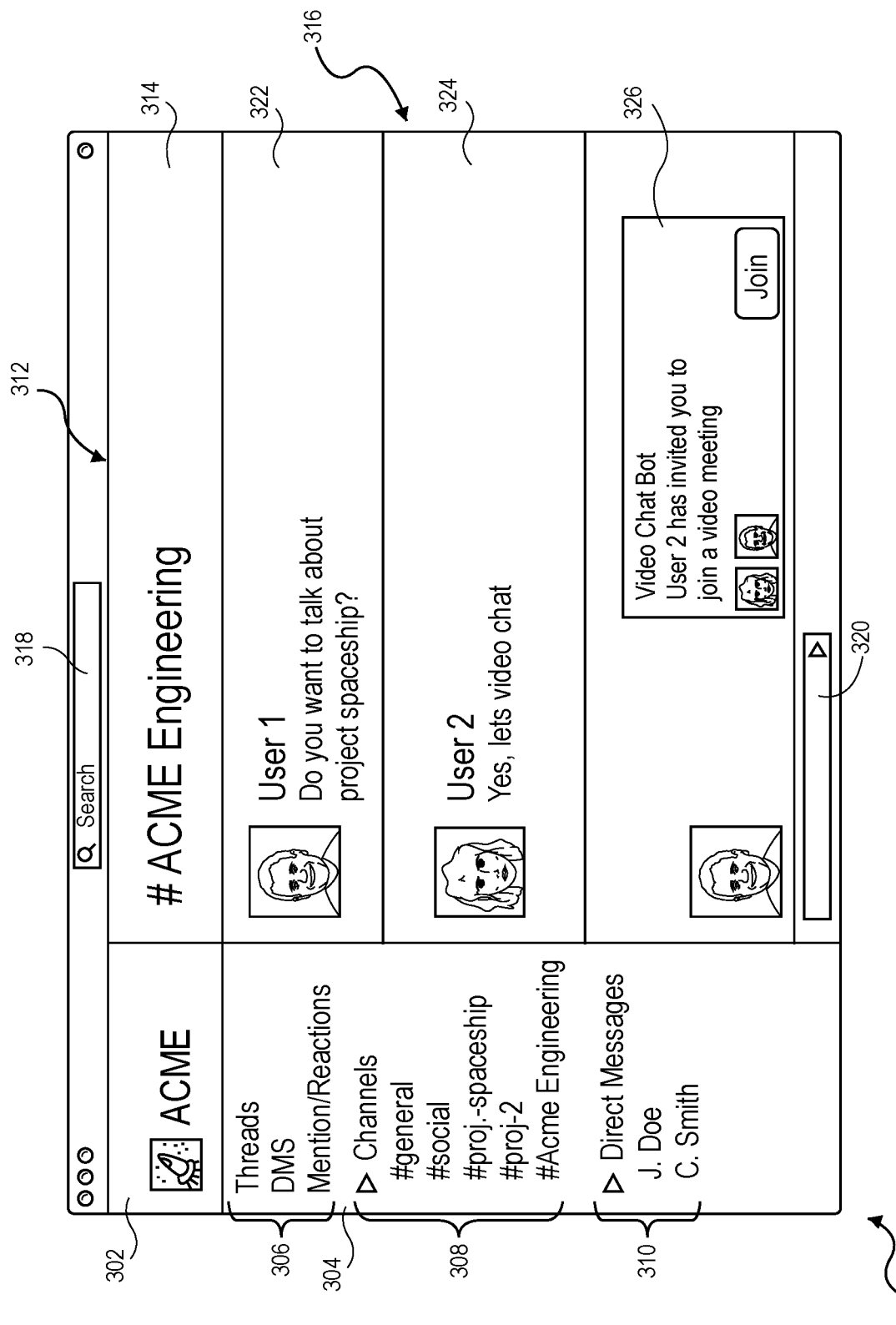
FIG. 3A illustrates a user interface of the run-time for the group-based communication system in which a user request to access a target domain is granted.

FIG. 3A illustrates a user interface 300 of a run-time of a group-based communication system, which will be useful in illustrating the operation of various embodiments, as discussed in further detail below. Broadly, user interface 300 comprises a plurality of objects such as panes, text entry fields, buttons, messages, or other user interface components. As depicted, user interface 300 comprises workspace pane 302; channel list pane 304, which comprises quick info list 306, channel list 308 and direct message list 310; channel pane 312, which comprises channel header 314, channel display 316, search pane 318, and compose pane 320.

As depicted, user interface 300 includes workspace pane 302 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. Users may navigate between channels using channel list pane 304. Channel list pane 304 may comprise quick info list 306 comprising various links for a user to quickly access portions of the group-based communication system. For example, as depicted, quick info list 306 comprises threads, Direct Messages (DMs), and mentions/reactions. Quick info list 306 may be configurable by the user to add various links to areas of the group-based communication system for quick access, such as a link to view all files shared within the group-based communication system. Channel list pane 304 may also comprise channel list 308 listing all channels to which the user has subscribed to or to which the user has been granted access. In some embodiments, channel list pane 304 further includes direct message list 310. Direct message list 310 comprises a list of messages sent from a user directly to another user of the group-based communication system, which may be displayed in channel pane 312 when selected. Direct messages may be sent to one other user or to any number of users.

User interface 300 may further comprise channel pane 312 that displays information related to the currently displayed channel. In some embodiments, within the group-based communication system, communication may be organized into "channels," each channel dedicated to a particular topic or set of users. For example, Acme Software Engineering company utilizing the group-based communication system may have a channel #general to discuss general company matters and a #proj-spaceship channel to discuss a live project. Teams within the software engineering firm may have their own channels as well, such as a #qa channel for a quality assurance team. Members of a particular channel can post messages within that channel that are visible to other members of that channel together with other messages in that channel. In some embodiments, or for certain selected channels, messages may be visible only to channel members; in other embodiments or for other channels, non-members of a channel may be able to preview messages in a channel without joining. Users may select a channel for viewing to see only those messages relevant to the topic of that channel without seeing messages posted in other channels on different topics.

User interface 300 may also include channel header 314, which may display metadata for the currently selected channel, including channel name, channel membership, and channel topic. User interface may also comprise channel display 316, where messages, multimedia, and other communications may be generated and displayed for users to view. User interface 300 may also include search pane 318. Search pane 318 may allow users to search for content located in the current workspace of the group-based communication system, such as files, messages, channels, members, commands, functions, and the like. As previously mentioned, user interface 300 may also include compose pane 320. Compose pane 320 allows users to compose and transmit messages to the members of the channel. Compose pane 320 may have text editing functions such as bold, strikethrough, and italicize. Compose pane 320 may also allow users to format their messages or attach files such as, but not limited to, document files, images, videos, or any other files to share the file or files with other members of the channel.

Through user interface 300, a user interfacing with an installed application may trigger an attempt to access a target domain in the group-based communication system. For example, in response to a first user posting a message requesting a meeting 322, a second user may reply in the channel display 316 with a request to join a video meeting 324. In some embodiments, the request to join a video meeting 324 may include an application link 326 associated with the video conferencing application, which may cause the application to (attempt to) connect to a particular domain. Responsive to the second user's invocation of the application to start a video meeting 324, and prior to granting access to the domain, the group-based communication system may call out to a manifest associated with the application or an allow list associated with the organization, workspace, or the channel the two users are currently using and run a check of the requested domain against a list of pre-approved domains specifically accessible by the application or generally accessible to any application installed in the group-based communication system. Following the check, a determination may be made whether the target domain is on the manifest or allow list or is otherwise approved for access by an administrator.

In some embodiments, a user request to access the target domain may only be granted if the target domain is included in the manifest of the application or an allow list of the group-based communication system. For example, access may be granted if either: (i) if the specific target domain is included on the application manifest, or (ii) if the target domain is globally or locally pre-approved via inclusion on an allow list. If either condition is met, then the user request to access the target domain will be granted. Following the determination that the target domain is included on the manifest or allow list, the application may then be granted access to the target domain. In some embodiments, a user may be unaware of this process, and will receive no information informing the user that the target domain is included in an allow list or has otherwise been pre-approved by an administrator. In other embodiments, a notification may be displayed to the user in the user interface 300, informing the user that access to the target domain has been granted. If neither condition is met, then the application request to access the target domain will be denied, and an error message may be displayed, as discussed below.

Figure 3B:
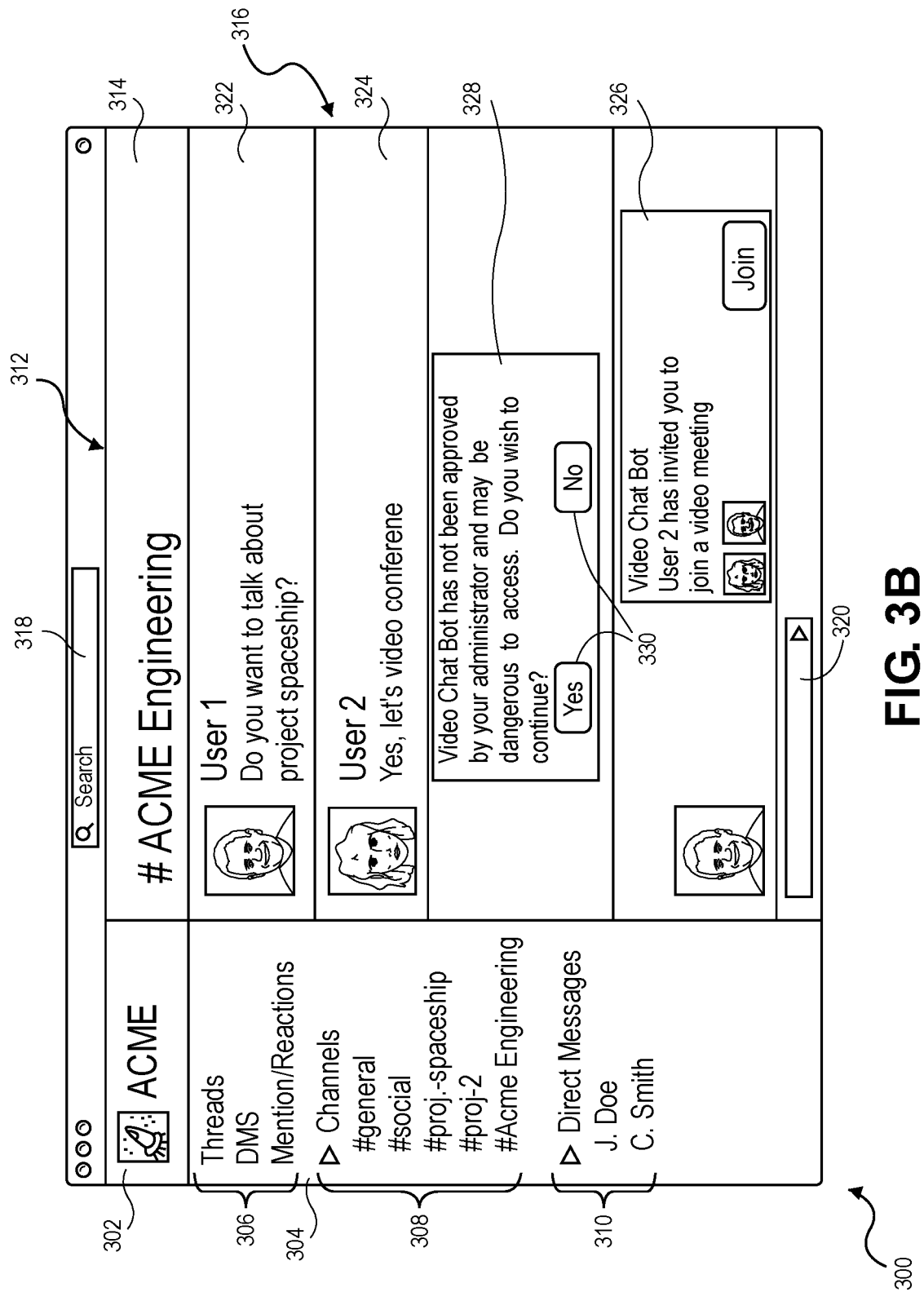
FIG. 3B illustrates a user interface of the run-time for the group-based communication system in which a user request to access a target domain is denied.

FIG. 3B illustrates an embodiment of user interface 300 after an attempt to access the target domain is denied. In some embodiments, access to the target domain may be denied if the target domain is not included in a manifest for the application or allow list for the group-based communication system. Following a determination that the target domain is not included in a manifest or allow list or has not otherwise been pre-approved by an administrator, the request to access the target domain by the application may be denied. In some embodiments, following a determination that access to the target domain is denied, a notification may be generated and displayed to the user in user interface 300. For example, a denial notification 328 may be generated and displayed in channel display 316 and comprise text or other indicators that the request to access the target domain is denied. In some embodiments, the denial notification 328 may be generated and displayed in the channel display 316 only of the user whose action triggered the request. In other embodiments, the denial notification 328 may be generated and displayed in the channel display 316, allowing all members of the channel to see the notification. In further embodiments, denial notification 328 may be generated and displayed in user interface 300 as an overlay, rather than generated in channel display 316. For example, the denial notification 328 may be a text box including information related to the denial of access.

In some embodiments, the denial of access to the target domain or resource may be a final determination, requiring the user to contact an administrator to either add a permission for the application, or to provide special access to the target domain. Accordingly, in such embodiments, there may be no action that a user may take without administrator intervention that will grant the user access to the target domain. In further embodiments, a user may be able to access the target domain even if the target domain is not included in an approved application manifest or allow list or otherwise pre-approved by an administrator. For example, following a determination that the target domain is not included in an approved application manifest or allow list, denial notification 328 may be generated and displayed in the user interface 300. In some embodiments, denial notification 328 may additionally include an option for the user to allow the application to access the target domain. For example, denial notification 328 may inform the user that access to the target domain has not been approved by an administrator, and accessing the target domain may contain risks, including data loss, granting the application access to the user's camera or microphone, among other identifiable risks. Denial notification 328 may further provide the user with an option to allow the application to proceed to the target domain, which may require affirmative election by the user, such as through a clickable button 330 or other express method of election. The user may then choose to accept the risk associated with allowing the application to access a non-approved domain and choose to proceed. Following this choice, the application may be allowed to proceed to connect to the target domain. Additionally, the user may choose not to accept the risk, and choose not to allow the application to connect to the non-approved domain.

In some embodiments, an application's failed attempt to access a target domain may be recorded and stored in a memory for analysis, security, or other informational purposes. For example, if an application attempts to access a domain not included in its manifest, this may be an indication of a security risk associated with that application. As another example, repeated attempts by multiple applications to access the same target domain may provide an administrator cause to review the domain to determine whether the domain should be included in the allow list. Additionally, repeated failed attempts to access the same target domain may be indicative of a domain with malicious code, attempting to gain access to the group-based communication system. Such repeated failed attempts may prompt the administrator to review the domain to determine whether the domain is malicious, and whether any security actions are required.

Figure 4:
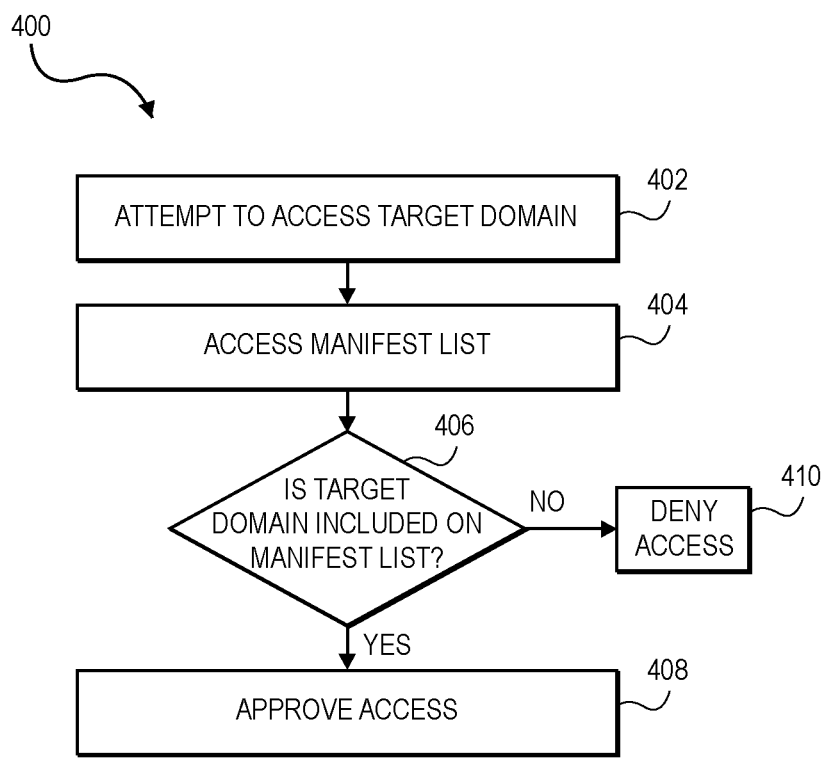
FIG. 4 illustrates an exemplary method of requesting access to a domain from a group-based communication system.

Turning now to FIG. 4, an exemplary method is depicted by reference numeral 400. Initially, in some embodiments, at step 402, during the use of a group-based communication system, a user may invoke an application's attempt to access a target Internet domain. The application used by the user may be any of the applications described above with reference to online applications. For example, the user of the group-based communication system may be using a video conferencing application that attempts to access an Internet domain associated with the video conferencing application. To access the target online domain of the video conferencing application, the API of the group-based communication channel may connect to the API of the target Internet domain. A user may attempt to initiate access to the target domain through a user interface of the group-based communication system.

Next, at step 404, prior to calling out to the target internet domain on behalf of the application, the group-based communication system may access a manifest associated with the application. In some embodiments, the application manifest may comprise a list of one or more domains or other resources previously approved by an administrator or other user having the credentials to approve or deny access to domains and resources that may be accessible by the application within the group-based communication system. In some embodiments, the manifest may be specifically associated with the specific channel of the group-based communication system the user is currently using. In further embodiments, the manifest may be associated with the workspace or organization of the group-based communication system. In some embodiments, the group-based communication system, after accessing the manifest, may additionally review an additional list of globally or locally pre-approved domains to make a determination as to whether the target internet domain is one that has previously been approved by an administrator for all applications.

Next, at a test 406, a determination may be made as to whether the target Internet domain or resource the application attempted to access has been approved for access by the administrator. If the domain or resource was approved for the application to access, processing proceeds to step 408; otherwise, if the domain or resource was not approved, processing instead proceeds to step 410.

At step 408, the application may then connect to the target internet domain. In some embodiments, this approval process is transparent to the requesting application and the user whose action triggered the request. In some embodiments, the successful access by the application of the domain or resource is logged for security or analysis purposes.

Conversely, if the results of test 406 indicate that request should be denied, processing proceeds to step 410, where the attempt to access the domain or resource is denied. For example, the group-based communication system may provide an HTTP 401, 403, 503, or other error code responsive to an attempt by the application to connect via HTTP. Alternatively, the group-based communication system may block the request at the transport layer, by returning a TCP RST packet responsive to the connection handshake. In still another embodiment, the IP packets to establish the connection may be blocked or generate an error at the network level. Accordingly, the application will not connect to the target internet domain. If the attempt is to access a local resource (such as a camera, microphone, or file system), the attempt may similarly return an error. In some embodiments, before any error is returned, the access attempt is held in abeyance for the user or administrator to manually approve or deny the attempt, as described above. Finally, in some embodiments, the unsuccessful attempt to access the domain or resource by the application of the domain or resource is logged for security or analysis purposes.

Although the invention has been described with reference to the embodiments illustrated in the attached drawing figures, it is noted that equivalents may be employed, and substitutions made herein without departing from the scope of the invention as recited in the claims.

The invention claimed is:

1. One or more non-transitory computer-readable media storing computer-executable instructions that, when executed by a processor, perform a method for establishing a framework for managing application permissions in a group-based communication system, the method comprising:
   receiving, from an application in the group-based communication system a request to access a target internet domain, wherein the group-based communication system includes a plurality of virtual spaces that each facilitate communications between different groups of users of the group-based communication system;
   accessing, based on an application manifest associated with the application, a list of one or more approved internet domains previously approved by an administrator of the group-based communication system for the application;
   determining whether the target internet domain is included in the list of one or more approved internet domains;
   determining one or more updates to the application; and
   upon determining that the target internet domain is included in the list of one or more approved internet domains and based on the one or more updates, allowing the application to access the target internet domain.

2. The one or more non-transitory computer-readable media of claim 1, wherein the list of the one or more approved internet domains is further based on an allow list, the allow list selected from a set consisting of a channel-specific allow list indicating a list of domains approved for access in a first context of a particular channel, a workspace-specific allow list indicating a list of domains approved for access in a second context of a particular workspace, and a global organization allow list indicating a list of domains globally approved for access in a third context of a given organization.

3. The one or more non-transitory computer-readable media of claim 1, wherein the list of the one or more approved internet domains includes a prior-version history of one or more approved internet domains.

4. The one or more non-transitory computer-readable media of claim 1, wherein the method further comprises:
   responsive to denying access to the target internet domain, prompting a user to manually approve or deny access to the target internet domain, wherein the user is the administrator or a triggering user whose action triggered an attempt to access the target internet domain.

5. The one or more non-transitory computer-readable media of claim 4, wherein the method further comprises:

responsive to the user manually approving access to the target internet domain, adding the target internet domain to the list of the one or more approved internet domains for the application.

6. The one or more non-transitory computer-readable media of claim 1, wherein the method further comprises:
responsive to denying access to the target internet domain sending a notification of an attempt to the administrator.

7. The one or more non-transitory computer-readable media of claim 6, wherein the notification includes an affordance allowing the administrator to approve access to the target internet domain.

8. A method for establishing a framework for managing application permissions in a group-based communication system, the method comprising:
receiving, from an application in the group-based communication system a request to access a target internet domain, wherein the group-based communication system includes a plurality of virtual spaces that each facilitate communications between different groups of users of the group-based communication system;
accessing, based on an application manifest associated with the application, a list of one or more approved internet domains previously approved by an administrator of the group-based communication system for the application;
determining whether the target internet domain is included in the list of one or more approved internet domains;
determining one or more updates to the application; and
upon determining that the target internet domain is included in the list of one or more approved internet domains and based on the one or more updates, allowing the application to access the target internet domain.

9. The method of claim 8, wherein the list of the one or more approved internet domains is further based on an allow list, the allow list selected from a set consisting of a channel-specific allow list indicating a list of domains approved for access in a first context of a particular channel, a workspace-specific allow list indicating a list of domains approved for access in a second context of a particular workspace, and a global organization allow list indicating a list of domains globally approved for access in a third context of a given organization.

10. The method of claim 8, wherein the list of the one or more approved internet domains includes a prior-version history of one or more approved internet domains.

11. The method of claim 8, further comprising:
responsive to denying access to the target internet domain, prompting a user to manually approve or deny access to the target internet domain, wherein the user is the administrator or a triggering user whose action triggered an attempt to access the target internet domain.

12. The method of claim 11, further comprising:
responsive to the user manually approving access to the target internet domain, adding the target internet domain to the list of the one or more approved internet domains for the application.

13. The method of claim 8, further comprising:
responsive to denying access to the target internet domain sending a notification of an attempt to the administrator.

14. The method of claim 13, wherein the notification includes an affordance allowing the administrator to approve access to the target internet domain.

15. A system for establishing a framework for managing application permissions in a group-based communication system, the system comprising:
a data store;
a processor; and
one or more non-transitory computer-readable media storing computer executable instructions that, when executed by the processor, perform a method of establishing a framework for managing application permissions in the group-based communication system, the method comprising:
receiving, from an application in the group-based communication system a request to access a target internet domain, wherein the group-based communication system includes a plurality of virtual spaces that each facilitate communications between different groups of users of the group-based communication system;
accessing, based on an application manifest associated with the application, a list of one or more approved internet domains previously approved by an administrator of the group-based communication system for the application;
determining whether the target internet domain is included in the list of one or more approved internet domains;
determining one or more updates to the application; and
upon determining that the target internet domain is included in the list of one or more approved internet domains and based on the one or more updates, allowing the application to access the target internet domain.

16. The system of claim 15, wherein the list of the one or more approved internet domains is further based on an allow list, the allow list selected from a set consisting of a channel-specific allow list indicating a list of domains approved for access in a first context of a particular channel, a workspace-specific allow list indicating a list of domains approved for access in a second context of a particular workspace, and a global organization allow list indicating a list of domains globally approved for access in a third context of a given organization.

17. The system of claim 15, wherein the list of the one or more approved internet domains includes a prior-version history of one or more approved internet domains.

18. The system of claim 15, wherein the method further comprises:
responsive to denying access to the target internet domain, prompting a user to manually approve or deny access to the target internet domain, wherein the user is the administrator or a triggering user whose action triggered an attempt to access the target internet domain.

19. The system of claim 18, wherein the method further comprises:
responsive to the user manually approving access to the target internet domain, adding the target internet domain to the list of the one or more approved internet domains for the application.

20. The system of claim 15, wherein the method further comprises:
responsive to denying access to the target internet domain sending a notification of an attempt to the administrator.

* * * * *